Figure 6:
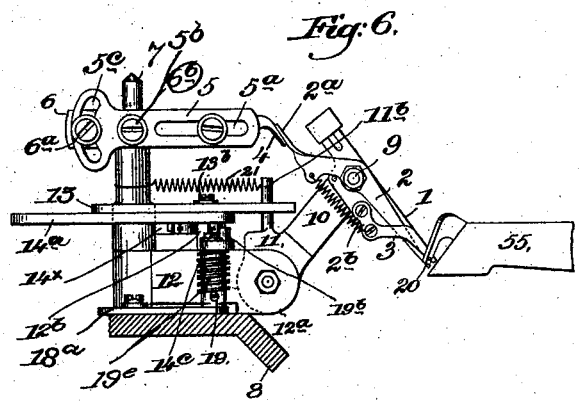

(No Model.) 6 Sheets—Sheet 1.
C. TERROT.
KNITTING MACHINE.
No. 605,065. Patented May 31, 1898.
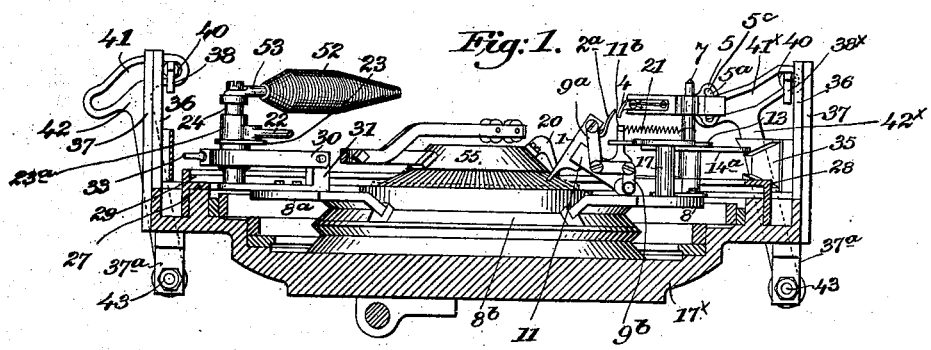
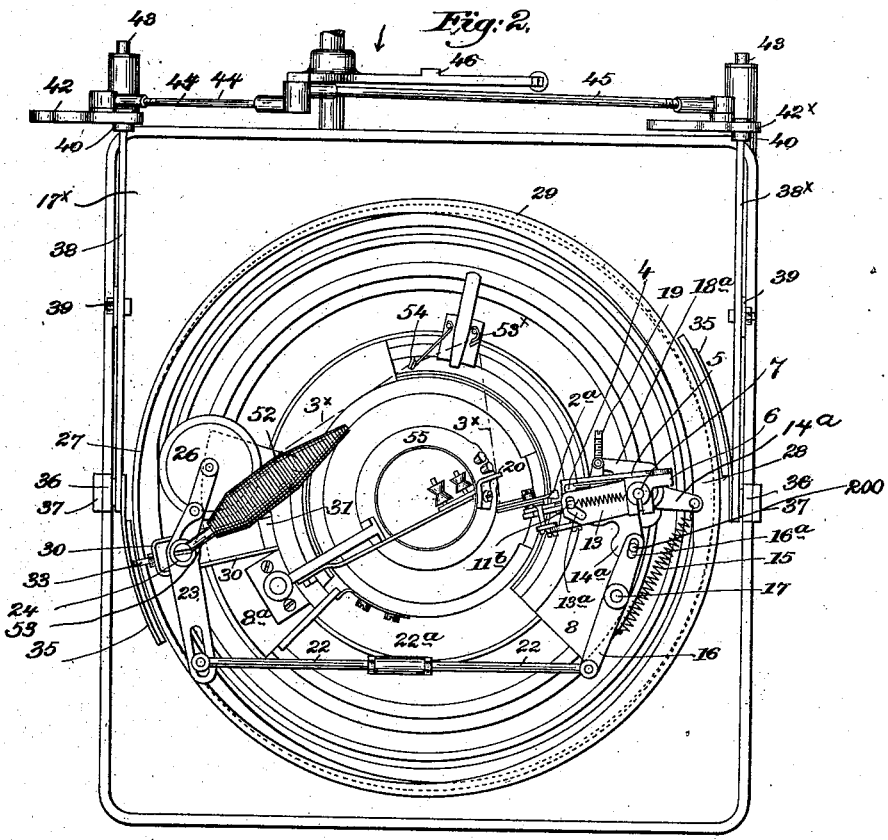
Witnesses.
Edward F. Allen
Thomas J. Drummond
Inventor.
Charles Terrot.
by Crosby & Gregory
attys.

(No Model.) 6 Sheets—Sheet 2.

C. TERROT.
KNITTING MACHINE.

No. 605,065. Patented May 31, 1898.

Witnesses.
Edward F. Allen.
Thomas J. Drummond.

Inventor.
Charles Terrot.
by Crosby & Gregory
attys.

(No Model.) 6 Sheets—Sheet 3.

C. TERROT.
KNITTING MACHINE.

No. 605,065. Patented May 31, 1898.

Witnesses.
Edward F. Allen
Thomas F. Drummond

Inventor.
Charles Terrot.
by Crosby & Gregory
attys.

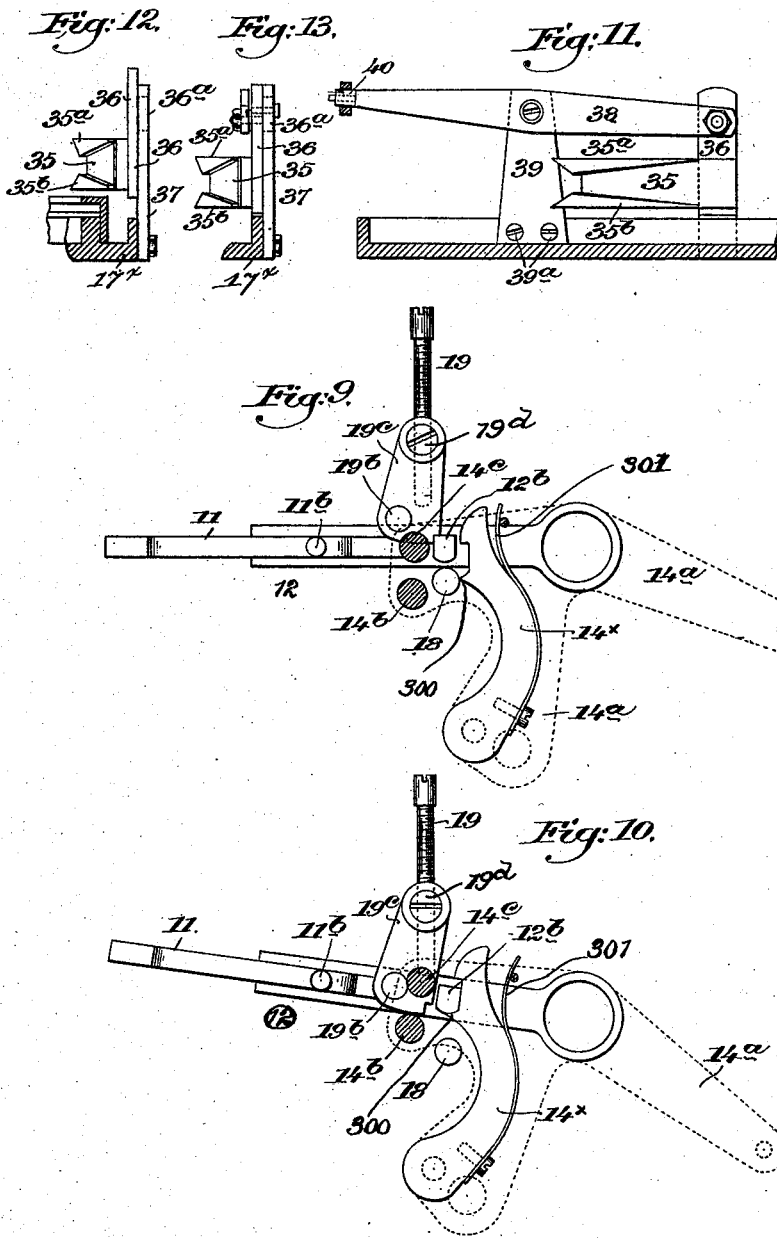

(No Model.) 6 Sheets—Sheet 5.
C. TERROT.
KNITTING MACHINE.
No. 605,065. Patented May 31, 1898.
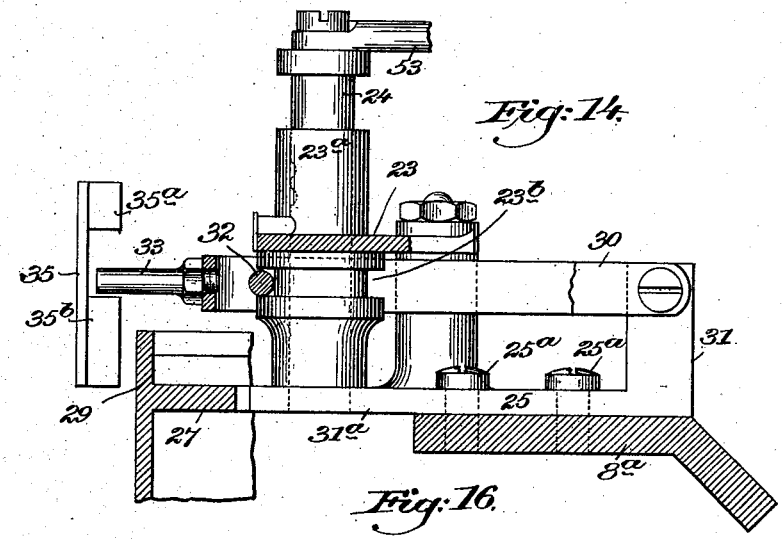
Fig. 14.
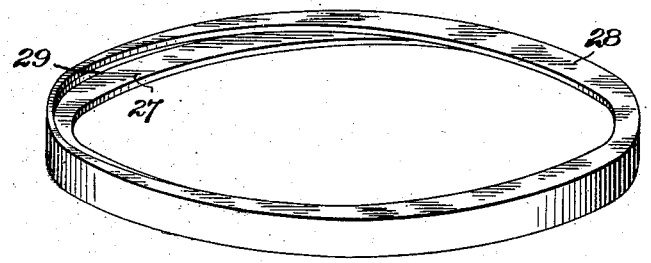
Fig. 16.
Fig. 17.
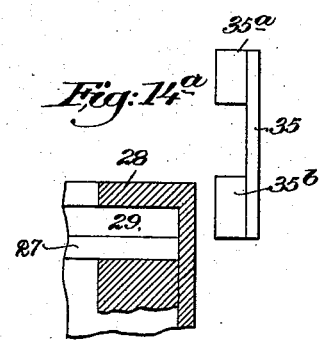
Fig. 14ª.
Witnesses.
Edward F. Allen.
Thomas J. Drummond.
Inventor.
Charles Terrot,
by Crosby & Gregory
attys.
THE NORRIS PETERS CO., PHOTO-LITHO., WASHINGTON, D. C.

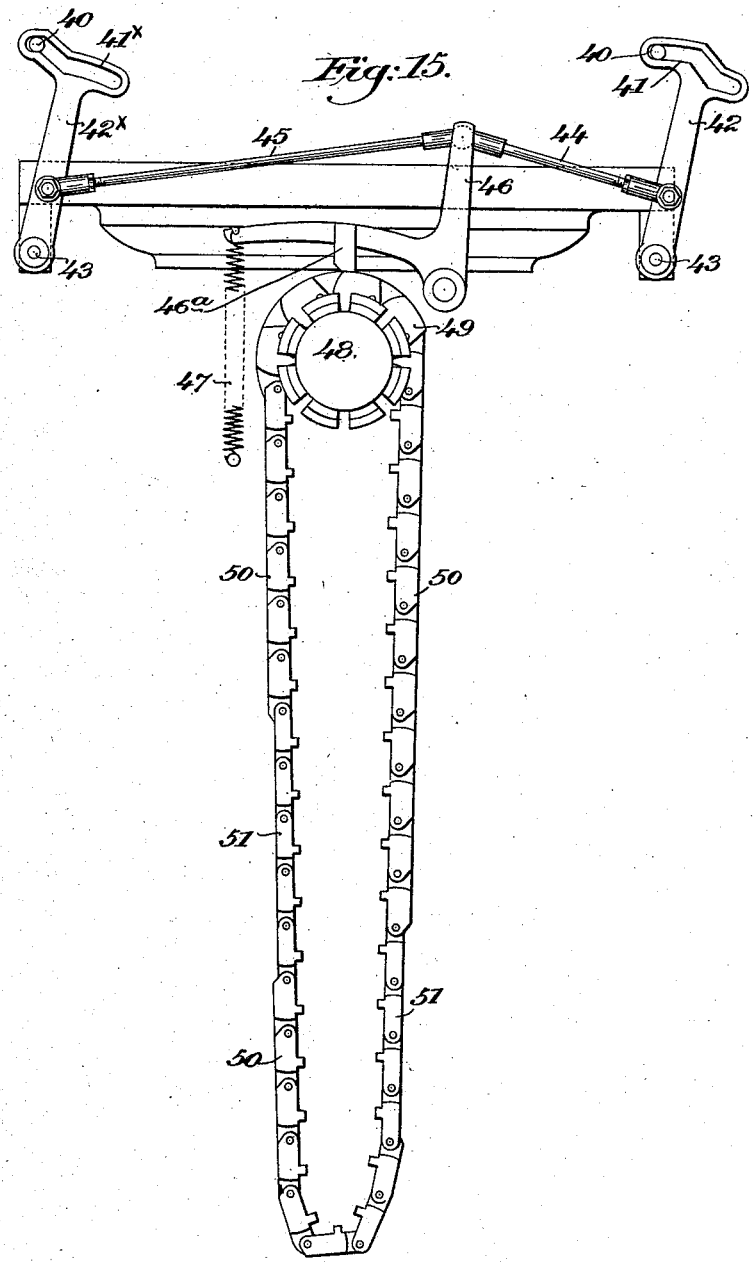

UNITED STATES PATENT OFFICE.

CHARLES TERROT, OF CANNSTADT, GERMANY, ASSIGNOR TO MORITZ BOAS, OF ST. HYACINTHE, CANADA.

KNITTING-MACHINE.

SPECIFICATION forming part of Letters Patent No. 605,065, dated May 31, 1898.

Application filed October 8, 1894. Renewed December 28, 1897. Serial No. 664,111. (No model.) Patented in England April 6, 1894, No. 6,873.

*To all whom it may concern:*

Be it known that I, CHARLES TERROT, a subject of the Emperor of Germany, residing at Cannstadt, in the Kingdom of Würtemberg, German Empire, have invented an Improvement in Knitting-Machines, of which the following description, in connection with the accompanying drawings, is a specification, like figures on the drawings representing like parts, the said invention having been made the subject of British Patent No. 6,873, dated April 6, 1894.

This invention has for its object to provide a circular-knitting machine with means whereby a splicing-thread may be introduced at intervals at desired points in order that said thread may show at the front or back of the fabric, considering it as a tube made into a stocking, the apparatus herein to be described being adapted to introduce splicing-thread with the greatest precision, certainty, and regularity at a predetermined point.

In many machines now in use and containing devices for inserting a splicing-thread the said thread is led into the needles by or through its adhesion to the main thread; but in such plans great difficulty is experienced in putting the splicing-thread into the fabric always at the proper point, and like difficulty is occasioned due to failure of the main thread to take the splicing-thread with it properly into the fabric, and in this latter event it sometimes happens that several courses are knitted beyond the point where the splicing-thread should commence to show, thus producing bad work.

In accordance with this invention the splicing-thread is controlled by a device which performs the function of both clamping the said thread and also of cutting it, and said device, hereinafter designated as the "splicing-thread device," has imparted to it at times when the splicing-thread is to be introduced into the fabric a movement in the direction of rotation of the cam-carrying ring and down to and so as to put the thread in position between the needles, and thereafter, after the needles shall have taken the splicing-thread and caught it securely in the fabric, the said splicing-thread device is moved upwardly and backwardly toward a splicing-thread guide and is opened and made to close upon the splicing-thread between said thread-guide and fabric and sever the splicing-thread and at the same time clamp its end ready to be again introduced positively between the needles by the said splicing-thread device, as before described. The time of operation of the splicing-thread with relation to the needles is under the control of a jacquard pattern-chain, as will be described.

One part of this invention consists in the combination, with a circular series of needles, a needle-actuating cam-ring, and a splicing-thread guide, of a splicing-thread device having jaws adapted to grasp and cut the splicing-thread between said thread-guide and said needles and hold the end of the said splicing-thread until again to be presented to the needles, substantially as will be described.

Other features of my invention will be hereinafter described, and pointed out in the claims at the end of the specification.

The present specification, in connection with the drawings to be described, has been prepared chiefly to illustrate and describe my improved splicing-thread device and its actuating means; but it will be understood that the needles in the machine referred to are arranged in a conical bed, that the hooked ends of the needles near the latches are protected by the conical shell or thread-rest, and that the main thread will run to the needles of the machine from the rolls or sheaves located above the needle-bed, and that said main thread or it and another thread, one or both, may come from thread-arms, substantially as provided for in United States Patent No. 479,986, dated August 2, 1892.

Figure 7:
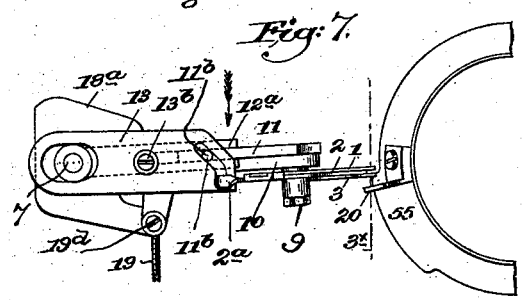
Figure 8:
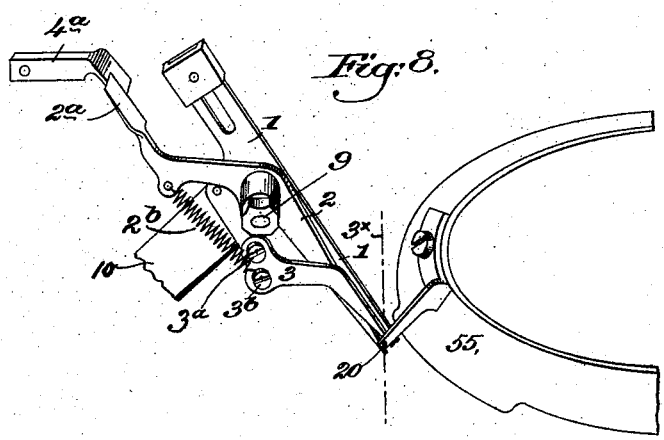

Figure 1 is a view, partially in elevation and section, of a sufficient portion of a circular-knitting machine of the class represented in United States Patent No. 479,986, dated August 2, 1892, with my improvements added, to enable my invention to be understood, the bed-plate of the machine being partially broken out to show parts contained within it. Fig. 2 is a plan view of the parts of the machine shown in Fig. 1, the needles being omitted from both views. Fig. 3, in elevation, shows part of the shield or thread-rest located above the ends of the needles, together with my improved splicing-thread mechanism. Fig. 4 is a top or plan view of the devices shown in Fig. 3 below the dotted line $x'$. Fig. 5, in perspective, shows part of the thread-rest with its attached thread-guide for the splicing-thread, together with part of the splicing-thread device, the latter being in a different position from that shown in Fig. 4. Fig. 6 shows the devices represented in Fig. 3, but viewed from the opposite side. Fig. 7 is a plan view of the devices shown in Fig. 6, with the exception of the arm 5 and the devices attached thereto. Fig. 8 is a detail chiefly to show enlarged the splicing-thread device. Figs. 9 and 10 are plan views of like parts in different positions, said parts being located below the plate $14^a$. Fig. 11 is a detail showing one of the cam-slides controlled by or through the pattern-surface to determine the time of operation of the splicing-thread device. Figs. 12 and 13 are details, in different views, of the parts represented in Fig. 11. Fig. 14 shows, in elevation, some of the devices instrumental in raising and lowering the carriage or lever carrying the trundle 26; Fig. $14^a$, a detail to be referred to; Fig. 15, a view of some of the parts of the machine, looking at the same in the direction of the arrow, Fig. 2, the monitor and the pattern-chain carried by it and the monitor-lever being added. Figs. 16 and 17 represent, in perspective and in section, the splicing-thread tracks detached from the machine.

The splicing-thread device, it having for its purpose and function to grip, introduce, and also to sever and regrip the splicing-thread, consists, essentially, of three plates 1, 2, and 3, the center plate 2 being movable relatively to the plates 1 and 3 and, as shown, being movable between them. At times when the splicing-thread $3^x$ is to be severed and at the same time gripped by the device the plate 2 occupies a position between and central with the other two, so that the said splicing-thread is held fast between the same and not allowed to feed into the needles, as in Figs. 2, 3, 4, and 5. At other times the central plate 2 is moved on its fulcrum so as to leave a space between it and plates 1 and 3, between or through which the splicing-thread passes immediately prior to being severed, as in Figs. 6, 7, and 8. The central plate 2 during the time it and its attached mechanism are traveling from the thread-eye 20 to the point where the splicing-thread is to be introduced to the needles is located between its neighboring plates, and it remains in this position during part of its return journey until just immediately prior to reaching the thread-eye again, when the said central plate is opened, so as to permit the splicing-thread to pass over it and under the two plates, one on either side thereof, whereupon the said central plate suddenly resumes its normal position, thereby simultaneously severing and gripping the splicing-thread. This central plate 2 is flattened at its higher end $2^a$, Figs. 2, 7, and 8, and is opened by passing over a cam-surface 4, the tail $4^a$ of which is pivoted to a plate $4^b$, Fig. 3. This latter is also screwed to an adjacent plate 5, so that it and the cam-surface 4 can be adjusted horizontally in a slot $5^a$ in the plate 5, Fig. 6, or they may be adjusted in a curvilinear direction by releasing the fulcrum-screw $5^b$ of the plate 5 and the screw $6^a$, located within the curved slot $5^c$. Both the screws $5^b$ and $6^a$ pass into a block 6, Figs. 2, 3, and 6, which is bored to pass over a vertical spindle 7, rigidly fixed in the plate 8, the latter being screwed to the usual cam-ring $8^b$, Fig. 1, of the knitting-machine and revolving in the bed-plate $17^x$. The tail $4^a$ of the cam-surface 4 is forked, Fig. 3, and the lower member of the said fork bears against a pin $4^c$, which prevents the cam-surface being lowered when the flattened end of the central plate 2 passes over it to be raised thereby, but it allows the said cam-surface to be raised slightly when the said flattened end of the central plate passes thereunder, the result of which is that the latter is not influenced thereby, which is necessary when the splicing-thread is being conveyed from the thread-eye to the point at which it is introduced between the needles. A spring $4^d$, Fig. 3, under the upper member of its forked tail $4^a$, insures the cam-surface 4 being maintained in its normal and operative position, as indicated in Figs. 1, 3, 6, 7, and 8. The plates 1 and 2 are fulcrumed at 9 on a plate 10, which latter is adjustable within a slot $11^a$, Fig. 3, in an oblique arm 11, movably pivoted in the bifurcated end $12^a$ of a main arm 12, whose opposite tubular end is passed over the enlarged lower end of the vertical spindle 7 and is made movable thereabout, as will be described, by the plate $14^a$. The plate 3 is fixed by screws $3^a$ $3^b$, Fig. 8, to the other outside plate 1, while the central plate 2 is maintained in its normal position (gripping the thread) by a spring $2^b$, Figs. 3 and 6, which is connected thereto and to the plate 1. The plate 1, loosely pivoted at 9 to the plate 2, is kept in position by a bent arm $9^a$, Figs. 1 and 3, adjustably connected at one end to a plate $9^b$, which is rigidly fixed at $9^c$ to the main arm 12. The oblique arm 11 has on its upper edge a vertical pin $11^b$, Figs. 3, 4, 6, and 7, which passes through a diagonal slot $13^a$ in a horizontal plate 13, the opposite end of which is slotted to surround the spindle 7, the said pin being connected to a suitable tension-spring 21. This horizontal plate 13 is attached by a screw $13^b$ to a plate $14^a$, which is partly thereunder and which has a rearward extension, Figs. 1, 2, 3, and 4, and a spring 15 connected thereto and to a lever 16, Figs. 1 and 2, the latter moving on the upper end of a vertical spindle 17, carried by plate 8, the said lever being furnished at one end with a slot $16^a$, (see Fig. 2,) which passes over a stud or projection 200 on a lateral extension of the plate 14ª. (See Figs. 2 and 4.) When the lever 16 is moved on its fulcrum by the running of the lever 26 over the tracks 27 or 28, the said lever moves the plates 14ª and 13, and the slotted end of the plate 13 acting on the pin 11ᵇ moves with it the arm 12 about the spindle 7 until the latter arm meets the pin 18 on a plate 18ª, (see Figs. 3 and 6,) secured to the plate alongside of the spindle 7, the movement in the opposite direction being limited by a screw 19, by the adjustment of which the extent of the movement might be varied. In actual practice it is found convenient to make the movement equivalent to the space occupied by about three or four needles. When the main arm 12 and attached mechanism have completed this movement in an arc of a circle, which in reality corresponds to the distance from the splicing-thread eye 20 to the point where a needle is descending to draw its loop, the main arm 12 will stand against the vertical pin 18, as in Figs. 3 and 4. The lever 16, Fig. 2, may, however, still continue to move on its fulcrum 17, moving with it the two horizontal plates 13 and 14ª, causing the slot 13ª in the plate 13 to travel over the vertical pin 11ᵇ, Figs. 3, 4, 6, and 7, causing the oblique arm 11 to be moved on its fulcrum to lower the thread-gripping device close to the needles and in the position indicated in Figs. 1, 2, 3, 4, and 5, in which position it will remain until the splicing-thread has been engaged by the needles. When the thread-gripping device was being moved away from the thread-eye 20 in the arc of a circle, as hereinbefore referred to, the flattened end 2ª of the central plate 2, without being itself rotated on its pivot, passed under the cam-surface 4 and raised it slightly, and the said device thereupon descended, laying the splicing-thread under the hooks of the needles, and in doing so passed out of contact with the cam-surface, as indicated in Figs. 1, 2, and 3. After the thread has been introduced to the needles the thread-introducing device is raised by reversing the movement of lever 16 and the plate 13, and the flattened end 2ª of the central plate 2 in rising passes up the cam-surface 4, thus moving plate 2 from between its adjacent plates 1 and 3, thereby opening the gripping device, as in Figs. 6, 7, and 8. The latter remains thus open during the time the flattened end 2ª is passing over the cam-surface, as the main arm 12, in making its return journey, and while so open it passes across the path of the splicing-thread, as in Figs. 7 and 8. Immediately after the end 2ª of the plate 2 leaves the cam-surface 4 the spiral spring 2ᵇ, Figs. 3 and 6, suddenly causes the plate 2 to resume its normal position between the plates 1 and 3, so that the splicing-thread is gripped and simultaneously severed thereby and the end of the said thread is held between the plates 2 and 3.

The plate 14ª has on its under surface two pins 14ᵇ and 14ᶜ and a spring-controlled hooked catch 14ˣ, Figs. 9 and 10. The longer pin 14ᵇ of lever 14ª when the inner end of lever 16 is moving toward the circle of needles abuts against the main arm 12 and moves the latter back toward the thread-eye 20, this being done after the thread-introducing device, however, has been moved from its position from near the needles and the thread has been delivered thereto, and as the thread-introducing device is moved toward the thread-guide the pin 14ᶜ travels over the catch-plate 19ᶜ and meets the pin 19ᵇ thereon, thus turning the said spring-controlled catch-plate about a stud 19ᵈ of the plate 18ª and against the torsion-spring 19ᵉ, tending normally to hold it in the position shown in Fig. 9, the catch-plate being thus moved away from the stud 12ᵇ (see Figs. 9 and 10) on the main arm 12, the plate 14ª in its movement causing the heel 300 of the hooked catch 14ˣ, carried thereby, to pass beyond the pin 18 and, acted upon by spring 301, come into position to engage the said stud 12ᵇ. Normally and while the thread device is traveling from the thread-eye 20 to the point where it descends to the needles the hooked catch 14ˣ is in engagement with the stud 12ᵇ on the main arm 12 to keep the latter in position; but immediately the thread-introducing device commences to descend to the needles the hooked catch 14ˣ comes again into contact with the pin 18, Figs. 3, 9, and 10, and is thereby moved out of engagement with the stud 12ᵇ simultaneously the pin 14ᶜ moves out of contact with the pin 19ᵇ, and the catch-plate 19ᶜ, by the action of spring 19ᵉ, thereupon engages the stud 12ᵇ on the main arm and holds the latter firm while the thread-introducing device is being lowered to take the thread to the needles.

The lever 16, Fig. 2, is connected to a lever 23 by a rod 22, made adjustable in length by turning the threaded tube 22ª. The lever 23 is fulcrumed on a vertical spindle 24, Figs. 1, 2, and 14, which is supported by a plate 25, connected by screws 25ª to the plate 8ª, attached to the usual needle-actuating cam-ring 8ᵇ of the knitting-machine and revolving therewith. The lever 23, which may be moved up and down on the spindle 24, as hereinafter explained, has attached to its opposite end an antifriction trundle or roller 26, which rests on or moves along the edge of one or the other of preferably two splicing-thread cam-tracks 27 and 28, made as rings, Figs. 1, 2, 14, and 16, thereby imparting motion in the manner described to the splicing-thread introducing and severing device. These cam-tracks 27 28 (shown most clearly in Fig. 16) are provided with eccentric faces fixed with relation to the needle-cylinder, and the relative positions they occupy with regard to each other are determined according to the part of the tube of fabric which is to be spliced. In the present invention each of the cam-tracks is constructed and arranged so that the splicing-thread will be laid onto about one-half of the full complement of needles. By employing two such cam-tracks, as indicated in Figs. 1, 2, and 16, and fixing them in reverse positions provision is thus made for laying the splicing-thread onto the whole circle of the needles, and thus, if desired, thickening the complete tube of fabric for a certain number of courses in the course of production. By the present disposition of the cam-tracks splicing may take place at one time on one half of the needles, so as to thicken that part of the tube of fabric which is to form the knee of a stocking, and at a different time splicing may be effected on the opposite half of the circle of needles, so as to thicken the fabric at the back of the ankle and at the bottom or sole of the foot of a stocking or sock.

In order to effect a change in the splicing from one half of the needles to the remaining or opposite half thereof, the antifriction disk or roller 26, Fig. 2, is either raised or lowered onto one or the other of the two cam-tracks 27 28, and for this purpose the lever 23, to which it is connected, is movable up and down the stud 24, upon which it is carried. A ring or true circle 29, Figs. 1, 14, 16, and 17, is located, preferably, between the two cam-tracks 27 28, so that when ordinary unspliced knitting is to be done the disk 26 rotates thereon between the tracks 27 and 28, and during such time the splicing mechanism is out of operation. For the purpose of raising the said disk onto one or the other of the two cam-tracks the boss 23$^a$ on spindle 24 is provided (see Figs. 1 and 14) with an annular groove 23$^a$, which is entered by a pin 32 of a forked lever 30, fulcrumed at one end to a projection 31 on the plate 31$^a$, connected to the plate 8$^a$ of the needle-actuated cam-ring 8$^b$.

The raising and lowering of the lever 30 is effected by the contact of the pin 33 of the lever with slides or raising and lowering devices or cams, to be hereinafter described, and the up-and-down movement of the said lever 30 raising and lowering the disk 26 to come into proper position with relation to the tracks. These slides, one of which is shown in Figs. 11, 12, and 13, are also capable of being raised and lowered to be placed into or out of operative position for acting on the pin 33. Fig. 11 shows a face view of the slide on one side of the machine, while the relative end views may be seen in Figs. 12 and 13. Each of these slides consists of two cam-plates 35$^a$ 35$^b$, fixed in such relative positions to each other as to raise or lower the pin 33 and thus move the roller 26 either onto the edge of one of the cam-tracks 27 or 28, so as to place the splicing apparatus in operation or leave it opposite the true circle 29, located between such cam-tracks, and thereby put the splicing apparatus out of operation. These cam-plates 35$^a$ 35$^b$, each duplicated and located at diametrically opposite points on the bed-plate, are either formed as part of or connected to a plate 35, and to permit the cam-plate to be raised or lowered, as described, the latter has a vertical extension 36, carrying a projection 36$^a$ (see Fig. 11) slidably mounted in a slot 36$^a$ (see Figs. 12 and 13) of an adjacent plate 37, connected at one end to the bed-plate 17$^\times$, the upper ends of said extension being connected each, respectively, to a suitable rocking lever 38 and 38$^\times$, which levers are fulcrumed to vertical arms 39, secured at 39$^a$ to the bed-plate 17$^\times$.

The levers 38 and 38$^\times$ are provided at their opposite ends each with an antifriction-roller 40, (see Figs. 1, 11, and 15,) located within a cam-groove 41 or 41$^\times$ in the upper end of a rocking arm 42 or 42$^\times$, pivoted in like manner on studs 43 of extensions 37$^a$ of the bed-plate. The two rocking arms 42 and 42$^\times$ are connected by rods 44 45 to a monitor-lever 46, (see Figs. 2 and 15,) the toe 46$^a$ of which by means of the spring 47 is kept in contact with the links of a pattern-chain, revolving in contact with the usual monitor or chain wheel 48.

Three kinds of links are employed in the pattern-chain—viz., high 49, medium 50, and small 51—and these are brought into requisition, as hereinafter described, according as the splicing is to take place on one or the other of the two halves of the circle of needles or the splicing mechanism is to be placed out of action. When the high links 49 come under the toe 46$^a$ of the monitor-lever 46, the latter actuates the arms 42 and 42$^\times$, as shown in Figs. 1 and 15, and lowers the slides through one of the rocking arms 42, so that the pin 33 moves the antifriction-roller into contact with the lower splicing-thread track 27, which is active for splicing the knee of a stocking. The medium-sized links 50 move the arms to place the cam-plates 35$^a$ and 35$^b$ in position to shift the roller 26 opposite the true circle 29 for unspliced work, as in the leg or heel and toe of a stocking, and the small links 51 move the arms 42 and 42$^\times$ to raise the cam-plates 35 and 35$^b$ to cause the arm 30 to place the roller 26 onto the upper track 28, which is active for the purpose of splicing on the other half-circle of needles, as in the upper part of the heel and the sole of the foot.

The bobbin 52, Figs. 1 and 2, carrying the splicing-thread, is mounted on a spindle 53, secured to the top of the stud 24 by a suitable screw, and the thread in leaving the said bobbin passes through the wires 53$^\times$ 54 and through the thread-eye 20, fixed to the latch-guard or thread-rest 55, as in Figs. 3 to 8.

The action of the hereinbefore-described mechanism during the production of a stocking with the splicing-thread inserted in the knee, back of the ankle, and foot-bottom is as follows: Commencing at the top of a stocking and having knitted in the usual way down to the point where the knitting of the knee is to take place the toe 46$^a$ of the monitor-lever 46 comes upon the first of the series of high links 49 in the pattern-chain, Fig. 15, whereupon the rocking arms 42 and 42× are moved on their fulcra 43, so that the cam slots or grooves 41 are moved along the rollers 40, whereby the roller in the right-hand rocking arm 42× (the left hand when looking at the back of the machine, as in Fig. 15) ascends the highest end of the slot, as in Figs. 1 and 15, thereby raising the end of the lever 38× and lowering the opposite end thereof and the slide attached thereto, so that the upper cam-plate 35$^a$ is moved into the path of the pin 33. The other roller 40 simultaneously moves along the horizontal part of the slot, so that the lever connected to the said roller is not influenced or altered in its position. In the next revolution of the machine the said pin 33 will come into contact with the under surface of the upper plate 35$^a$ and, moving thereunder, become depressed, so that the roll 26 is shifted from the true circle 29 into contact with the lower cam-track 27. The roll 26 now revolves in contact with the latter, and as it passes along the gradually-increasing width of the said track it is moved nearer and nearer to the center of the machine. The end of the lever 23 opposite to that bearing the roller is simultaneously moved outwardly, taking with it the connecting-rod 22, which moves inward the end of the lever 16 connected thereto, while the contrary movement is imparted to the opposite end thereof, thereby partially rotating the plates 13 and 14$^a$ and main arm 12 on the spindle 7 until the main arm abuts against the vertical spindle 18 and its motion stopped thereby. This movement will have caused the splicing-thread-introducing device attached to the main arm 12 to travel from the splicing-thread eye 20, against which it is normally located, and in a direction opposite to that in which the needle-actuating cam-ring 8$^b$ is rotated when circular knitting is being done, to a point just in the rear of the usual depressing-cam in readiness to lay the splicing-thread down by the side of and between the needles as the latter are being lowered in the usual way to take thread and form it into a loop. After the sidewise motion of the main arm 12 has been arrested by abutting against the spindle 18 the roll 26 continues to travel the still increasingly wider part of the cam-track 27, so that the two upper plates 13 and 14$^a$ only are moved thereby. The continued partial rotary movement of the plate 13 causes the pin 11$^b$ to be moved by reason of the angular slot 13$^a$ therein into the position in Fig. 1, thereby lowering the thread-introducing device down by the side of a needle, Figs. 4 and 5, just as the latter is being lowered to draw its loop, so that it engages not only the main knitting-thread, supplied in usual manner, as before stated, but also the splicing-thread. Immediately after the splicing-thread device commences to descend toward the needles the hooked catch 14×, moving with the plate 14$^a$, presses against the vertical pin 18, and is thereby moved away from the stud 12$^b$, Figs. 6, 9, and 10, and the pin 14$^c$ having also moved away from the pin 19$^b$ the catch-plate 19$^c$, on which the latter is fixed, immediately moves against the said stud 12$^b$ and holds its attached main arm 12 firmly in position. Simultaneously with the splicing-thread device reaching its lowest point between the needles the roll 26 arrives at the widest part of said cam-track. The track now continues of uniform width for some distance, so that the splicing-thread device remains in its lowest position for a short period—viz., until said thread has been engaged by at least three or four needles. The cam-track now becomes gradually narrower, the object of which is that the roll 26 may gradually get back to its original position, and thereby return the splicing-thread-introducing device to the point from which it traveled—viz., close up against the thread-eye. Upon the roll 26 commencing to travel along the gradually-narrowing portion of the cam-track 27 the lever 23, connecting-rod 22, and lever 16, under the influence of the spring 15, cause the plates 13 14$^a$ to move upon the spindle 7, while the spring 21 brings back the pin 11$^b$ to the oblique portion of the slot 13$^a$, so that the splicing-thread-introducing device is raised to its highest position, and at the same time the pin 14$^c$, attached to the plate 14$^a$, acts on a pin 19$^b$ and moves the catch-plate 19$^c$ away from the stud 12$^b$, and then the hooked catch 14× comes into position to engage said stud. When the splicing-thread-introducing device is in the act of rising, the upper flat portion 2$^a$ of the central plate 2 slides up the cam-plate 4, moving the said plate 2 on its fulcrum, so that its lower end is moved from between 1 and 3, thus opening said splicing-thread-introducing device, so as to engage the thread, as in Figs. 6, 7, and 8. The splicing-thread-introducing device, in consequence of the roll 26 moving along the narrowing part of the cam-track, now commences its return journey and travels toward the splicing-thread eye 20, in doing which it passes across the splicing-thread 3×, (see Figs. 6, 7, and 8,) so that the latter passes between the plate 2 and the plates 1 and 3, and thereupon the upper part of the plate 2 immediately passes out of contact with the cam-surface 4, so that the lower end of the said plate 2 immediately closes upon the splicing-thread, thereby severing it and at the same time holding or clamping it between the adjacent plates. The splicing-thread-introducing device will now have come up against the splicing-thread eye 20 and the roller 26 have reached the narrowest part of the cam-track. The above process will be repeated for any desired number of courses, according to the number of high links in the pattern-chain, thereby producing a spliced or thickened fabric on those needles—viz., one-half or thereabout of the entire circle—engaged in knitting the knee of a stocking.

After the knee has been knitted, as described, the toe of the monitor-lever will come upon the medium-sized links 50 in the pattern-chain, thereby returning the rocking arms 42 and 42× to their original position, the cam-plate rising slightly. Now the next time the pin 33 passes this cam-slide it will be lifted by the lower cam-plate 35ᵇ, which was moved into the path of the said pin, and the lever 30 will be raised to put the roller 26 opposite the true circle 29, at which time the leg-knitting will be carried on and the splicing-thread device will remain quiescent. After a sufficient number of courses to form the leg have been knitted the toe of the monitor-lever will come upon the small links 51 of the pattern-chain, and the other left-hand rocking arm 42 (right hand in Fig. 15) will now be moved, so that the roller 40 of lever 38 will be traversed to the extreme end of the slot 41 and be elevated thereby, and the cam-slide will be simultaneously raised, so that the lower cam-plate 35ᵇ will be put into the path of the pin 33, and upon the latter coming into contact with the said cam will be raised thereby, elevating the roller 26 above the true circle into contact with the upper cam-track 28, so that splicing will take place upon the opposite half of the circle of the needles during the knitting of the ankle or upper part of the heel. After this last-named part has been spliced the medium-sized links again come under the toe of the monitor-lever, returning the rocking arm 42, lowering the cam-slide, so that the upper cam 35ᵃ will act to depress the pin 33 and put the roller 26 again into the true circle for the making of the heel and toe. Small links are again brought into requisition for knitting and splicing the foot-bottom, and these are succeeded by medium links for knitting the toe.

I have hereinbefore described my invention as applied to one type of circular-knitting machine; but it will be obvious to those skilled in the art that my invention with only slight mechanical changes may be applied to different forms of well-known circular-knitting machines, so this invention is not limited to the exact construction shown for the devices, as I am not aware prior to my invention that any device was ever before employed to positively grasp between its members a splicing-thread and carry it into place between needles, deliver said thread to the needles, then release the splicing-thread, and return to its starting-point, the desired number of needles having been provided with splicing-thread, and then again grasp, cut off, clamp, and hold the end of the splicing-thread ready to be again delivered onto the needles, and all this carried on course after course under the control of a pattern surface or chain; nor am I aware that a splicing-thread device having the capacity of delivering splicing-thread to the needles has ever had combined with it a track or plurality of tracks to aid in moving the splicing-thread device into and out of operative position with relation to the machine-needles. The roller 26 acts merely to overcome friction between the lever 23 and the splicing-thread tracks. Just the same result would be effected if the end of said lever or a pin thereon should run on said track.

This invention is not limited to the exact construction shown for the splicing-thread device, as it might be differently shaped within the skill of the mechanic and yet clamp, hold, and cut off the splicing-thread as required by the machine acting as described.

The plates 1 2 3 constitute both jaws to clamp the thread and scissors by which to cut it off.

Having described my invention, what I claim, and desire to secure by Letters Patent, is—

1. The combination with a circular series of needles, a needle-actuating cam-ring, and a splicing-thread guide, of a splicing-thread-introducing device having jaws, means to move said splicing-thread device backward and forward with relation to the direction of rotation of said cam-ring, and toward and from the series of needles, and to open and close the said jaws whereby they are made to embrace the splicing-thread near said thread-guide, cut the splicing-thread, hold its end, and at a later period move toward said needles, deliver the splicing-thread thereto and then release the splicing-thread preparatory to returning to the said thread-guide, substantially as described.

2. In a circular-knitting machine, a circular series of latched needles, a needle-actuating cam-ring, a splicing-thread-introducing device mounted on said ring, a splicing-thread guide, means to move the said thread-introducing device at predetermined intervals in a direction opposite the rotation of a needle-actuating cam-ring to introduce the thread to the needles at a distance from the said thread-guide, and when taken by the needles, to retire from the splicing-thread and return to its starting-point near the said thread-guide, and means to thereafter cause the thread-introducing device to regrasp, cut and hold the said splicing-thread, substantially as described.

3. In a splicing apparatus for circular-knitting machines, a device provided with jaws for introducing the thread to the needles and holding it until it is engaged thereby, and means for moving the said device back again into the track of the thread, and means for opening and closing the jaws to reëngage and sever the thread in the manner described, substantially as described.

4. In a circular-knitting machine, a series of circularly-arranged latched needles, a splicing-thread guide, a needle-actuating cam-ring, and a splicing-thread-introducing device mounted thereon and having jaws, combined with a splicing cam-track having eccentric surfaces and with mechanism interposed between said track and said thread-introducing device to actuate the latter and cause it to travel back and forth from the needles to the splicing-thread guide, substantially as described.

5. In a knitting-machine, a splicing-thread-introducing device adapted to present its thread directly to the needles of the machine, two splicing-thread cam-tracks, actuating mechanism operated by the latter to cause the thread-introducing device to grasp and present the thread to the needles, and retire from the thread, and means to cause the said thread-introducing device to cut and reclamp the same, combined with devices to raise and lower said actuating mechanism to be operated by one or the other of said cam-tracks to determine the part of the tubular fabric to receive the splicing-thread, substantially as described.

6. In a splicing apparatus for circular-knitting machines, a splicing-thread device for introducing a splicing-thread to the usual machine-needles, two splicing-thread cam-tracks and an interposed circular ring, a lever having one end coöperating with one of said tracks, mechanism interposed between the said lever and the said splicing-thread device to actuate the latter, and means for automatically moving the said lever into and out of contact with the said tracks for the purpose described.

7. In a splicing apparatus for circular-knitting machines, a device for introducing a splicing-thread to the needles, splicing-thread cam-tracks, mechanism interposed between them and the said splicing-thread device to actuate the latter, combined with a cam-slide for causing the said interposed mechanism to be actuated by one or other of the said cam-tracks as desired, substantially as described.

8. In a splicing apparatus for circular-knitting machines, a splicing-thread device for introducing the thread to the needles, cam-tracks and mechanism interposed between them and the said splicing-thread device to actuate the latter, slides having cams for placing the said interposed mechanism in and out of contact with one of said cam-tracks, a pattern-chain, and devices between it and the slides having cams to operate the latter, substantially as and for the purpose described.

9. In a circular-knitting machine, a thread-introducing device composed of jaws to grasp the splicing-thread, means to move said thread-introducing device in the direction of travel of the needle-actuating cam-ring and present said thread to the needles, means to open said jaws to release the thread, means to move said device back to its starting-point in opposition to the movement of the said needle-actuating cam-ring, and means to grasp and sever the said splicing-thread near the thread-guide, substantially as described.

In testimony whereof I have signed my name to this specification in the presence of two subscribing witnesses.

CHARLES TERROT.

Witnesses:
AUG. FREUND,
ERNST HUBER.